US008843428B2

(12) United States Patent
Golan et al.

(10) Patent No.: US 8,843,428 B2
(45) Date of Patent: Sep. 23, 2014

(54) SURVEY PRIORITIZATION ENGINE

(75) Inventors: Shimon Golan, Haifa (IL); Frank Smadja, Haifa (IL)

(73) Assignee: Toluna USA, Inc., Wilton, CT (US)

( * ) Notice: Subject to any disclaimer, the term of this patent is extended or adjusted under 35 U.S.C. 154(b) by 361 days.

(21) Appl. No.: 13/238,467

(22) Filed: Sep. 21, 2011

(65) Prior Publication Data

US 2013/0073502 A1  Mar. 21, 2013

(51) Int. Cl.
*G06F 1/16* (2006.01)
*G06Q 30/02* (2012.01)

(52) U.S. Cl.
CPC .................................... *G06Q 30/02* (2013.01)
USPC .......................................................... 706/45

(58) Field of Classification Search
USPC ..................................................... 706/45, 46
See application file for complete search history.

(56) References Cited

U.S. PATENT DOCUMENTS

2005/0010543 A1* 1/2005 Lukomnik et al. ............... 706/46

OTHER PUBLICATIONS

EPO: Notice from the Euroepan Patent Office dated Oct. 1, 2007 concerning business methods, Official Journal of the European Patent Office, vol. 30, No. 11, Nov. 1, 2007, pp. 592-593.
European Extended Search Report for Application No. 12185024.2 dated Jan. 18, 2013.

* cited by examiner

*Primary Examiner* — Jeffrey A Gaffin
*Assistant Examiner* — Ola Olude Afolabi
(74) *Attorney, Agent, or Firm* — McCarter & English, LLP

(57) ABSTRACT

Exemplary embodiments are directed to prioritizing web-based survey based on a priority score associated with the survey. The priority score can be determined based on priority values that are determined for priority parameters associated with the survey. The priority values can be determined for priority parameters based on characteristic values of the web-based survey that are associated with the priority parameters. The priority score can establish a priority of the web-based survey relative to other web-based surveys.

23 Claims, 3 Drawing Sheets

SURVEY PRIORITIZATION ENGINE

BACKGROUND

Organizations are typically interested in obtaining valuable customer insight to assist in development of products and/or services, determine whether customers are satisfied, test advertising concepts and/or website effectiveness, and the like. In some instances, organizations obtain valuable customer insight using surveys and/or other market research techniques. For example, online web-based surveys provide organizations with an efficient environment for quickly reaching their target audience. Web-based surveys can allow organizations to view survey results as they become available. For example, when a respondent completes the survey, the respondent's answers to the questions in the survey can be processed and/or viewed by the organization that solicited the feedback.

Survey hosting sites can provide a central location for survey distribution and can maintain a pool of respondents for responding to the surveys on the site. The surveys hosted on the site may be ranked relative to each other to influence which surveys respondents complete. For example, a respondent may be more likely to respond to a survey that has a high ranking and less likely to respond to a survey that has a low ranking. Typical ranking algorithms rank objects based on popularity. For example, based on a quantity of responses a survey receives or a number of many times a survey is viewed. Such rankings may provide some benefit to respondents by indicating to respondents the surveys that have received the most attention from other respondents. However, popularity based ranking typically does little to provoke discovery of surveys that are less popular, but may be nonetheless of interest to respondents. Furthermore, conventional popularity based survey ranking schemes typical do little to promote surveys based on the survey host's preferences and/or the surveying entities preferences. For example, a host and/or surveying entity may wish to achieve higher survey throughput, encourage popular surveys to complete quickly, emphasize specific surveys, and/or highlight surveys that lag behind other surveys especially if the surveys are nearing expiration.

SUMMARY

In one aspect, a method for prioritizing an online web-based survey is disclosed. The method includes determining priority values for priority parameters associated with the web-based survey based on characteristic values associated with the priority parameters. The method also includes computing a priority score for the web-based survey based on the priority values. The priority score determines a priority of the web-based survey relative to other web-based surveys.

In another aspect, a non-transitory computer readable medium storing instructions is disclosed, wherein execution of the instructions by a processing device causes the processing device to implement a method for prioritizing an online web-based survey. The method implemented by execution of the instructions includes determining priority values for priority parameters associated with the web-based survey based on characteristic values associated with the priority parameters. The method implemented by execution of the instructions also includes computing a priority score for the web-based survey based on the priority values. The priority score determines a priority of the web-based survey relative to other web-based surveys hosted by the survey host site.

In yet another aspect, a system for prioritizing an online web-based survey is disclosed. The system includes a computer storage device and a processing device. The computer storage device stores characteristics associated with the web-based survey. The processing device is configured to determine priority values for priority parameters associated with the web-based survey based on characteristic values associated with the priority parameters and compute a priority score for the web-based survey based on the priority values. The priority score determines a priority of the web-based survey relative to other web-based surveys.

Other objects and features will become apparent from the following detailed description considered in conjunction with the accompanying drawings. It is to be understood, however, that the drawings are designed as an illustration only and not as a definition of the limits of the invention.

DESCRIPTION OF EXEMPLARY EMBODIMENTS

Exemplary embodiments of the present disclosure are directed to ranking online web-based surveys using one or more priority parameters. A survey ranking engine can allow a survey hosting entity to specify priority parameters, calculate priority values for the priority parameters, and prioritize the surveys based on the calculated parameters. The surveys can be prioritized according to a priority score that can be generated based on priority values associated with the priority parameters. The prioritizing implemented in accordance with the exemplary embodiments can be used to achieve increased throughput (more surveys completed), encourage popular surveys to complete even faster and thus keep users entertained, provide a way to manually push specific surveys by a backend system, emphasize surveys that lag behind especially if they are reaching an expiration date, and the like.

Figure 1:
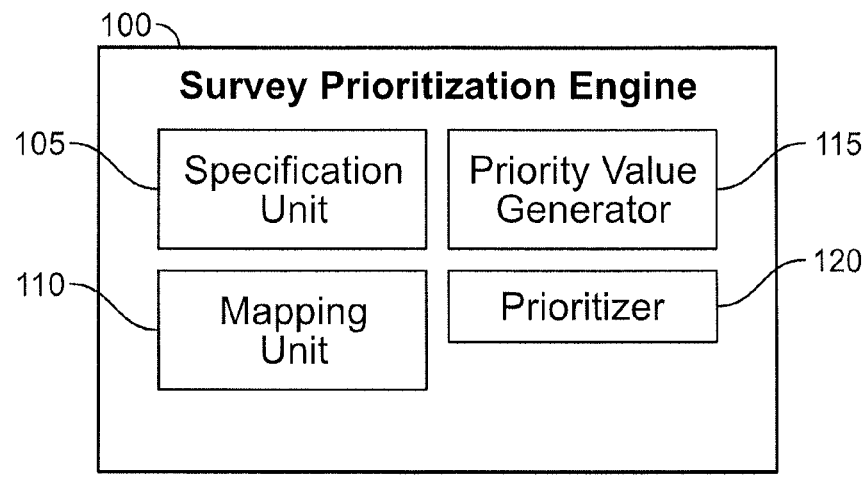
FIG. 1 is a block diagram of an exemplary survey prioritization engine.

FIG. 1 is a block diagram of an exemplary survey ranking engine 100 (hereinafter "engine 100"). The engine 100 can include a parameter specification unit 105 (hereinafter "specification unit 105"), a parameter mapping unit 110 (hereinafter "mapping unit 110"), a priority value generator 115 (hereinafter "generator 115"), and a prioritizer 120. The engine 100 can use priority values determined for priority parameters to generate a priority score for a survey. The priority score can be used by the engine 100 to prioritize the surveys. In exemplary embodiments, a survey can receive different priority scores based on different combinations of priority parameters used to generate the priority score and/or can be based on respondents available to complete the survey.

The specification unit 105 can allow a survey hosting entity to generate priority parameters to be used by the engine 100 when ranking the surveys. The priority parameters can be specified to emphasize or deemphasize characteristics associated with surveys and/or respondents, and can be specified to have possible priority value ranges. The priority value ranges can be used to weight each priority parameter relative to the other priority parameters. Defining value ranges for the priority parameters allows the hosting entity to control a possible effect of the priority parameters on the priority score. The priority parameters can be survey dependent and/or respondent dependent. For example, survey dependent priority parameters can be directed to characteristics of the surveys themselves, such as size, urgency, survey age, difficulty, popularity, and the like, of the survey. Respondent dependent priority parameters can be directed to characteristics of a potential respondent, such as demographic information (e.g., respondent's age, gender, ethnicity), credibility, response history, and the like. In exemplary embodiments, a priority parameter can be dependent on both survey characteristics and respondent characteristics. In exemplary embodiments, a priority parameter can be dependent on both survey characteristics and respondent characteristics.

Table 1 shows some exemplary priority parameters that can be specified using the specification unit 105, including urgency, total size, survey age, high priority, fee, free trial priority parameters, respondent age, and respondent gender. The priority parameters can be associated with quantifiable characteristics of the surveys, which can be used by the engine 100 when determining a priority value associated with the priority parameters. While Table 1 is illustrative of exemplary priority parameters, those skilled in the art will recognize that other and/or different survey dependent priority parameters can be specified. For example, priority parameters can be specified based on popularity of the survey, bidding (e.g., surveying entities that pay more for the survey hosting entity to host their survey can receive a more favorable ranking), survey difficulty (e.g., a difficult survey can receive a more favorable ranking), respondent dependent factors (e.g., respondent interests, reactivity of the respondent, trustability of the respondent), and the like.

The "total size" priority parameter can be specified as a survey dependent priority parameter for which a priority value is larger for smaller surveys. The total size priority parameter can be associated with quantifiable characteristics, such as, for example, a size (e.g., a number of questions, a number of pages, and the like) of the survey and a maximum allowed size of the survey.

The "age recency" priority parameter can be specified as a survey dependent priority parameter for which a priority value decreases as an age of the survey increases such that older surveys are deemphasized. The age recency priority parameter can be associated with quantifiable characteristics, such as, for example, a number of seconds, minutes, hours, days, weeks, months, years, and the like, that the survey has been available for response.

The "high priority", "fee", and "free trial" priority parameters can be specified as survey dependent priority parameters. The high priority survey can be used to override some, all, or none of the priority parameters so that the priority score of a survey is increased if the survey is determined to be a high priority survey. The fee priority parameter can be used to increase the priority score if the survey hosting site received a fee from the surveying entity to host the survey. The free trial priority parameter can be used to increase the priority score if the survey is being offered as a free trail to the surveying entity. The high priority, fee, and free trial priority parameters can be associated with quantifiable characteristics. For example, the high priority, fee, and free trial priority parameters can be associated with Boolean values, such as one or zero.

The "target difficulty" priority parameter can be specified as a survey and/or a respondent dependent priority parameter. The target difficulty priority parameter can increase or decrease the priority based the respondents the survey targets.

TABLE 1

| Parameters | Property of | Priority increase | Range | Description |
| --- | --- | --- | --- | --- |
| Age Urgency | Survey | The more urgent the higher the priority | 1-1.5 | Days needed to have complete results vs. days already in the field. When a survey is going to close the priority value can increase |
| Total size | Survey | Smaller surveys have a higher priority | 0.8-1.25 | Small surveys go first |
| Age Recency | Survey | New surveys get a boost | 0.9-1.11 | How long the survey has been available for response |
| High Priority | Survey | | 1-2 | High Priority is set manually to override the engine. |
| Fee | Survey | | 0.9 or 1 | Paid for surveys receive a higher priority value |
| Free trial | Survey | | 1 or 1.2 | High priority for free trials |
| Target difficulty | Survey/ Respondent | Survey with difficult target recipient receive a higher priority | 1-1.5 | Higher priority is given to surveys that are directed to difficult target respondents, such as, for example, respondents that are not likely to complete the survey. |
| Respondent Age | Respondent | | 0.9 or 1.1 | Target age of respondent of a survey affects priority value |
| Respondent Gender | Respondent | | 0.9 or 1 | Target gender of a survey affects priority value |

The "age urgency" priority parameter can be specified as a survey dependent priority parameter for which a priority value increases as the urgency increases. The age urgency priority parameter can be associated with quantifiable characteristics, such as, for example, a number of responses needed for the survey before the survey receives a desired number of responses and/or a number of days before the survey expires.

A survey that targets one or more defined demographic attributes can have a higher priority as compared to a survey that doe not target a particular demographic attribute. In some embodiments, the more demographic attributes a survey targets the higher the target difficulty parameter will be. As an example, a survey can target respondents based on age, gender, income, interests, and the like, and a value can be determined to correspond to the difficulty in receiving enough responses to complete the survey.

The "respondent age" priority parameter can be specified as a respondent dependent priority parameter and/or a survey dependent priority parameter. For example, a survey may target respondents between the ages of 18 and 35, and therefore, can increase the priority score for those respondents between the ages of 18 and 35 and decrease the priority score for those respondents that are not between the ages of 18 and 35. As such, the priority value associated with the respondent age priority parameter can be determined based on quantifiable characteristics of an individual respondent and/or a group of respondents.

The "respondent gender" priority parameter can be specified as a respondent dependent priority parameter and/or a survey dependent priority parameter. For example, a survey may target male or female respondents, and therefore, can increase or decrease the priority score based on the respondents gender. As such, the priority value associated with the respondent age priority parameter can be generated based on quantifiable characteristics of an individual respondent and/or a group of respondents.

The priority parameters can be associated with priority value ranges, which can be established using the specification unit 105. The priority value ranges can be specified to normalize the quantifiable characteristics of the priority parameters and emphasize or deemphasize priority parameters with respect to each other. For example, quantifiable characteristic values of the priority parameters can be mapped or converted to mapped values, which can be used to determine priority values within the priority value ranges. To normalize the quantifiable characteristics, a priority value of one is a neutral value results in neither an emphasis nor a de-emphasis of the priority parameter when determining the priority score for a survey. When a priority value is greater than one, the priority parameter is emphasized or has a greater effect on the priority score of a survey. When a priority value is less than one, the priority parameter is deemphasized or has a lesser effect on the priority score of a survey.

The mapping unit 110 can process the quantifiable characteristics of a priority parameter to generate a mapped value used to determine the priority value associated with a priority parameter. In exemplary embodiments, for some of the priority parameters, the mapping unit 110 can map the quantifiable characteristics associated with a priority parameter to a mapped value by multiplying a quantifiable characteristic value R associated with the quantifiable characteristic by two, dividing the resulting product by a maximum possible value L for the quantifiable characteristic, and subtracting one from the resulting quotient, which can be mathematically expressed as follows:

$$\text{Map}(MP) = (2*R \div L) - 1 \qquad (1)$$

OR $$\text{Map}(MP) = 1 - (2*R \div L) \qquad (2)$$

Some priority parameters can be associated with Boolean values such that the mapped value can equal the Boolean value. For these priority parameters equations (1) and (2) are not used and the quantifiable characteristics associated with the priority parameter and the mapped value for the priority parameter can be identical or can be the inverse (i.e., 1—value of the priority parameter).

The generator 115 can determine priority values for the priority parameters. The generator 115 can use mapping information for the priority parameters to determine the priority values. For example, the generator 115 can process the mapped value output by the mapping unit 110 using a step function to generate a step value. As one example, the step function implemented by the generator 115 can be expressed mathematically as follows:

$$\text{Step}(MP) = 1 \div (1 + e^{-5mP}), \qquad (3)$$

where MP represents the mapped value calculated by the mapping unit 110.

Figure 2:
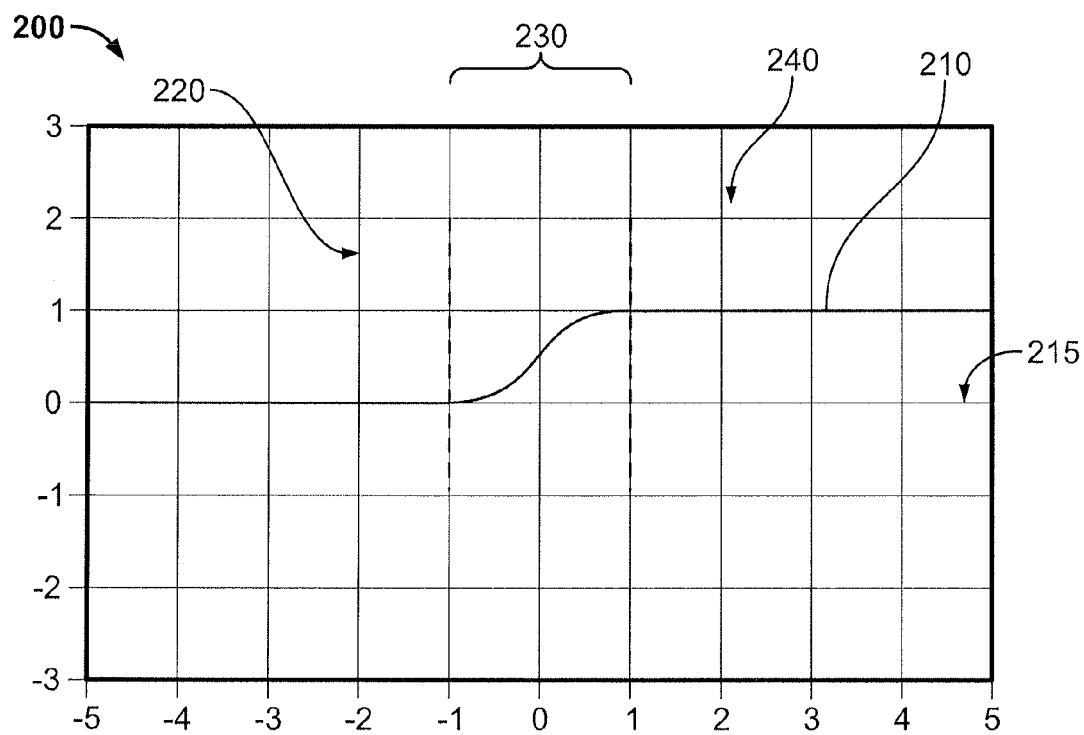
FIG. 2 shows a graph of an output of a step function used for determining a priority value of a priority parameter.

A plot 200 of an output 210 of the step function as a function of the mapped value 215 is shown in FIG. 2. As shown in FIG. 2, the output 210 of the step function can be divided into three value sections: a low value section 220, a transition value 230, and a high value 240. For mapped values that are less than about negative one, the output of the step function is in the low value section 220, which corresponds to an output value of zero in the present embodiment. For mapped values that are greater than one, the output of the step function is in the high value 230 section, which corresponds to an output value of one in the present embodiment. For mapped values between negative one and positive one, the output of the step function is in the transition section 240, which corresponds to an output value of between zero and one depending on the mapped value.

To determine the priority value, the generator 115 can multiply the output value of the step function by the range associated with the priority value and can add the minimum possible priority value for the priority parameter to the resulting product. The priority value calculated by the generator 115 can be expressed mathematically as follows:

$$P = \text{Min}(i) + \text{Range}(i) \times \text{Step}(\text{Map}(MP)), \qquad (4)$$

where P is the priority value, Min is a minimum possible priority value, and Range is the difference between a maximum possible priority value and the minimum possible priority value. Equation (4) can be specified so that when the mapped value is below zero, the priority value P is near the minimum possible priority value (Min(i)) and when the mapped value is above zero, the priority value P is near the sum of the minimum possible mapped value and the range of the mapped value (Min(i)+Range(i))

As one example, the mapping unit 110 and the generator 115 can be used to determine the priority value for the total size priority parameter. In exemplary embodiments, the total size S of a survey can vary from about 0 to about 5,000 questions. IN some embodiments, the total size can be defined by the number of paid quota. Thus, the quantifiable characteristic value R for the total size priority parameter is the total size S and the maximum possible value L of the quantifiable characteristic is 5,000. Using this information, the mapping unit 110 can determine the mapped value associated with the total size priority parameter using equation (1) as follows:

$$\text{Map}(S) = (2 \times S \div 5000) - 1 \qquad (5)$$

From Table 1, the total size priority parameter can have a priority value range of 0.8 to 1.25 such that the priority parameter can be deemphasized or penalized by as much as 0.2 when the survey size is large, or emphasized or boosted by as much as 0.25 when the survey size is small, recalling that a value of one is neutral. In the present embodiment, the minimum possible priority value (Min) is 0.8, the maximum possible priority parameter (Max) is 1.25, and the priority value range (Max−Min) is 0.45. Using this information, the priority value (P(Size)) of the total size priority parameter can be computed using eq. (4) as follows:

$$P(\text{Size}) = 0.8 + 0.45 \times \text{Step}(\text{Map}(\text{Size})) \qquad (6)$$

As another example, the mapping unit 110 and the generator 115 can be used to determine the priority value for the age-recency priority parameter. In exemplary embodiments, the age-recency "A" of a survey can vary from about 0 to about 336 hours (2 weeks). Thus, the quantifiable characteristic value R for the survey age priority parameter is the survey age A and the maximum possible value L of the quantifiable characteristic can be 336. Using this information, the mapping unit 110 can determine the mapped value associated with the survey age priority parameter as follows:

$$\text{Map}(A)=1-(2\times A\div 336) \tag{7}$$

From Table 1, the survey age priority parameter can have a priority value range of 0.9 to 1.1, such that the age-recency priority parameter can be deemphasized or penalized by as much as 0.1 when the survey is low, or emphasized or boosted by as much as 0.11 when the age-recency is high, recalling that a value of one is neutral. In the present embodiment, the minimum possible priority value (Min) is 0.9, the maximum possible priority parameter (Max) is 1.11, and the priority value range (Max−Min) is 0.21. Using this information, the priority value (P(Age)) of the survey age priority parameter can be computed using eq. (4) as follows:

$$P(\text{Age})=1+0.21\times \text{Step}(\text{Map}(\text{Age})) \tag{8}$$

As another example, the mapping unit 110 and the generator 115 can be used to determine the priority value for the free trial priority parameter. The free trial priority parameter is a Boolean (0 or 1) so that mapped value can equal the quantifiable characteristic of the free trial priority parameter, which can be expressed as follows:

$$\text{Map}(FT)=FT \tag{9}$$

From Table 1, the free trial priority parameter can have a priority value range of 1 to 1.25 such that the priority parameter can be emphasized or boosted by as much as 0.25 when the survey is a free trial for the survey entity, recalling that a value of one is neutral. In the present embodiment, the minimum possible priority value (Min) is 1, the maximum possible priority parameter (Max) is 1.2, and the priority value range (Max−Min) is 0.2. Using this information, the priority value (P(FT)) of the free trial priority parameter can be computed using eq. (4) as follows:

$$P(FT)=1+0.2\times \text{Step}(\text{Map}(FT)) \tag{10}$$

As another example, the mapping unit 110 and the generator 115 can be used to determine the priority value for the high priority priority parameter. The high priority priority parameter can be a flag so it can be represented as a Boolean (0 or 1) so that mapped value can equal the quantifiable characteristic of the high priority priority parameter, which can be expressed as follows:

$$\text{Map}(HP)=1 \text{ if } HP \text{ is true, and } -1 \text{ if } HP \text{ is false} \tag{11}$$

From Table 1, the high priority priority parameter can have a priority value range of 1 to 2, such that the priority parameter can be emphasized or boosted by as much as 1 when it is determined that the survey is a high priority, recalling that a value of one is neutral. In the present embodiment, the minimum possible priority value (Min) is 1, the maximum possible priority parameter (Max) is 2, and the priority value range (Max−Min) is 1. Using this information, the priority value (P(HP)) of the high priority priority parameter can be computed using eq. (4) as follows:

$$P(HP)=1+1\times \text{Step}(\text{Map}(\text{Highpriority})) \tag{12}$$

As another example, the mapping unit 110 and the generator 115 can be used to determine the priority value for the fee priority parameter. The fee priority parameter can be a flag so it can be represented as a Boolean (0 or 1), where a "zero" indicates a fee has been charged and a "one" indicates that no fee has been charged, so that the mapped value can equal a Boolean inverse of the quantifiable characteristic FV of the fee priority parameter, which can be expressed as follows:

$$\text{Map}(\text{Fee})=1-FV \tag{13}$$

From Table 1, the fee priority parameter can have a priority value range of 0.9 to 1.1 such that the priority parameter can be deemphasized or penalized by as much as 0.1 when no fee is charged for the survey, or emphasized or boosted by as much as 0.1 when a fee is charged for the survey, recalling that a value of 1 is neutral. In the present embodiment, the minimum possible priority value (Min) is 0.9, the maximum possible priority parameter (Max) is 1.1, and the priority value range (Max−Min) is 0.2. Using this information, the priority value (P(Fee)) of the fee priority parameter can be computed using eq. (4) as follows:

$$P(\text{Fee})=0.9+0.2\times \text{Step}(\text{Map}(\text{Fee})) \tag{14}$$

As another example, the mapping unit 110 and the generator 115 can be used to determine the priority value for the target difficulty priority parameter. The target difficulty priority parameter can be determined based on a quantity of demographic attributes, referred to as "targetcount," a survey uses to target respondents so that the mapped value can equal the quantifiable characteristic of the target difficulty priority parameter, which can be expressed as follows:

$$\text{Map}(\text{TargetCount})=-1 \text{ if TargetCount}=0;$$

$$0 \text{ if TargetCount}=1; \text{ and}$$

$$1 \text{ if Targetcount}=2 \text{ or more} \tag{15}$$

From Table 1, the target difficulty priority parameter can have a priority value range of 1 to 1.5, such that the priority parameter can be emphasized or boosted by as much as 0.5 based on the quantity of demographic attributes used to target respondents. In the present embodiment, the minimum possible priority value (Min) is 1, the maximum possible priority parameter (Max) is 1.5, and the priority value range (Max−Min) is 0.5. Using this information, the priority value (P(target difficulty)) of the target difficulty priority parameter can be computed using eq. (4) as follows:

$$P(\text{target difficulty})1+0.5\times \text{Step}(\text{Map}(\text{TargetCount})) \tag{16}$$

As another example, the mapping unit 110 and the generator 115 can be used to determine the priority value for the respondent age priority parameter. The respondent age priority parameter can be a flag so it can be represented as a Boolean (0 or 1), where a 1 indicates that the respondent is within the targeted age range of the survey and a 0 indicates that the respondent is outside the targeted age range of the survey, so that mapped value can equal the quantifiable Boolean characteristic of the respondent age priority parameter, which can be expressed using eq. (1) as follows:

$$\text{Map}(RA)=\text{Boolean}(RA) \tag{17}$$

From Table 1, the respondent age priority parameter can have a priority value range of 0.8 to 1.2, such that the priority parameter can be deemphasized or penalized by as much as 0.2 when the respondent is not within the targeted age range of the survey, or emphasized or boosted by as much as 0.2 when the respondent is within the targeted age range of the survey, recalling that a value of one is neutral. In the present embodiment, the minimum possible priority value (Min) is 0.8, the maximum possible priority parameter (Max) is 1.2, and the priority value range (Max−Min) is 0.2. Using this information, the priority value (P(RA)) of the respondent age priority parameter can be computed using eq. (3) as follows:

$$P(RA)=0.8+0.2\times\text{Step}(\text{Map}(RA)) \quad (18)$$

As another example, the mapping unit 110 and the generator 115 can be used to determine the priority value for the respondent gender priority parameter. The respondent gender priority parameter can be a flag so it can be represented as a Boolean (0 or 1), where a 1 indicates that the respondent is of the gender targeted by the survey and a 0 indicates that the respondent not of the gender the targeted by the survey, so that mapped value can equal the quantifiable Boolean characteristic of the respondent gender priority parameter, which can be expressed using eq. (1) as follows:

$$\text{Map}(RG)=\text{Boolean}(RG) \quad (19)$$

From Table 1, the respondent age priority parameter can have a priority value range of 0.9 to 1.2 such that the priority parameter can be deemphasized or penalized by as much as 0.1 when the respondent is not the gender targeted by the survey or emphasized or boosted by as much as 0.2 when the respondent is the gender targeted by the survey, recalling that a value of one is neutral. In the present embodiment, the minimum possible priority value (Min) is 0.9, the maximum possible priority parameter (Max) is 1.2, and the priority value range (Max−Min) is 0.3. Using this information, the priority value (P(RG)) of the respondent gender priority parameter can be computed using eq. (3) as follows:

$$P(RG)=0.9+0.3\times\text{Step}(\text{Map}(RG)) \quad (17)$$

As another example, the mapping unit 110 and the generator 115 can be used to determine the priority value for the age-urgency priority parameter. To generate a quantifiable characteristic of the age-urgency priority parameter, the past rate and required rate for survey completion can be used. A survey becomes urgent when the past completion rate is insufficient to complete the survey with a specified period of time, such as a day, week, before it expires, and like. The past rate can be determined based on a quantity of survey responses that have been completed divided by an amount of time the survey has been available for response. The required rate can be the set to a calculated required rate or a normal rate, which ever is greater. The normal rate can be a predetermined value, such as 500 responses per 24 hours. The calculated required rate can be determined based on a quantity of response required before the survey receive a desired quantity of responses divided by an amount of time before the survey will expire, which can be referred to as the time remaining. If the time remaining is zero, the time remaining can be set to one to avoid dividing by zero. When the required rate is greater than or equal to past rate, the urgency parameter can be set to the difference between the required rate and the past rate. Otherwise, the urgency parameter can be set to zero.

As one example, a survey can have an initial requirement of 5,000 responses to be completed within five days. If the survey has been available for response for three days with 3,000 responses to be completed within the remaining two days of the survey, the required rate is 62.5 survey completions in per hour (3000 completions/48 hours) and the past rate is 27.8 completions per hour (2000 completions/72 hours. In this example, the required rate is greater than past rate. Therefore, the urgency is equal to the required rate minus the past rate (62.5−27.8=34.7). As another example, a survey can require 9,000 response within forty five days. If the survey has been available for response for ten days with 3,000 responses to be completed within the remaining thirty-five days, the normal rate of 500 completions per hour would result in completion of the survey in nine more days. In this example, the normal rate is used as the required rate and the urgency can be set to zero. In exemplary embodiments, the maximum value for the urgency parameter can be limited to one hundred.

A survey can be considered urgent if the required rate is greater than or equal to the passed rate and can be considered non-urgent if the required rate is less than the passed rate. As such, the age-urgency of a survey can be represented by a quantifiable Boolean characteristic, where a 1 indicates that the survey is urgent and a 0 indicates that the survey is not urgent, so that mapped value can equal the quantifiable Boolean characteristic of the urgency priority parameter, which can be expressed using eq. (1) as follows:

$$\text{Map}(\text{Urgency})=\text{Urgency} \quad (18)$$

From Table 1, the urgency priority parameter can have a priority value range of 1 to 1.5 such that the priority parameter can be emphasized or boosted by as much as 0.5 when the survey is urgent, recalling that a value of one is neutral. In the present embodiment, the minimum possible priority value (Min) is 1, the maximum possible priority parameter (Max) is 1.5, and the priority value range (Max−Min) is 0.5. Using this information, the priority value (P(Urgency)) of the urgency priority parameter can be computed using eq. (3) as follows:

$$P(\text{Urgency})=0.9+0.3\times\text{Step}(\text{Map}(\text{Urgency})) \quad (19)$$

The prioritizer 120 can compute the priority score for a survey based on the priority values determined by the generator 115. The priority score can be computed by the prioritizer 120 as follows:

$$\text{priority\_score}=\Pi_{i=0}^{n}P(i)=P(0)*P(1)*P(2)*\ldots*P(n) \quad (20)$$

where P(i) can represent the priority parameters for a survey. For example, P(0) can represent the total size priority parameter, P(1) can represent the survey age parameter, and so on. The prioritizer 120 can evaluate the priority score for each survey and can evaluate the priority scores to determine a priority of a survey with respect to the other surveys. In exemplary embodiments, the prioritizer 120 can use different combinations of priority parameters to determine the priority score depending on the priority parameters specified for the survey, the survey itself, a respondent or group of respondents for the survey, and the like.

In exemplary embodiments, the engine 100 can update the priority scores associated with the survey when a quantifiable characteristic used to determine the priority values of the priority parameters that are used to determine the priority score change. As such, the engine 100 can maintain a real-time contemporaneous priority score for each survey such that changes in the underlying data used to generate the priority scores are reflected in the priority scores.

In exemplary embodiments, the priority scores can be updated periodically. For example, a update period of, for example, five minutes can be specified such that every five minutes, the priority scores for the surveys are update. Alternatively, the priority score for only those surveys for which the underlying data has changed can be updated according to the update period.

In exemplary embodiments, the priority score can be generated for each respondent, such that the priority score is customized for the respondents. For example, a first respondent may be a female between the ages of 18 and 35 and a second respondent can be a male between the ages of 35-45. Surveys that target females between the ages of 18 and 35 can have a higher priority score for the first respondent than for the second respondent. As such, the engine 100 can generate respondent dependent priority scores.

Figure 3:
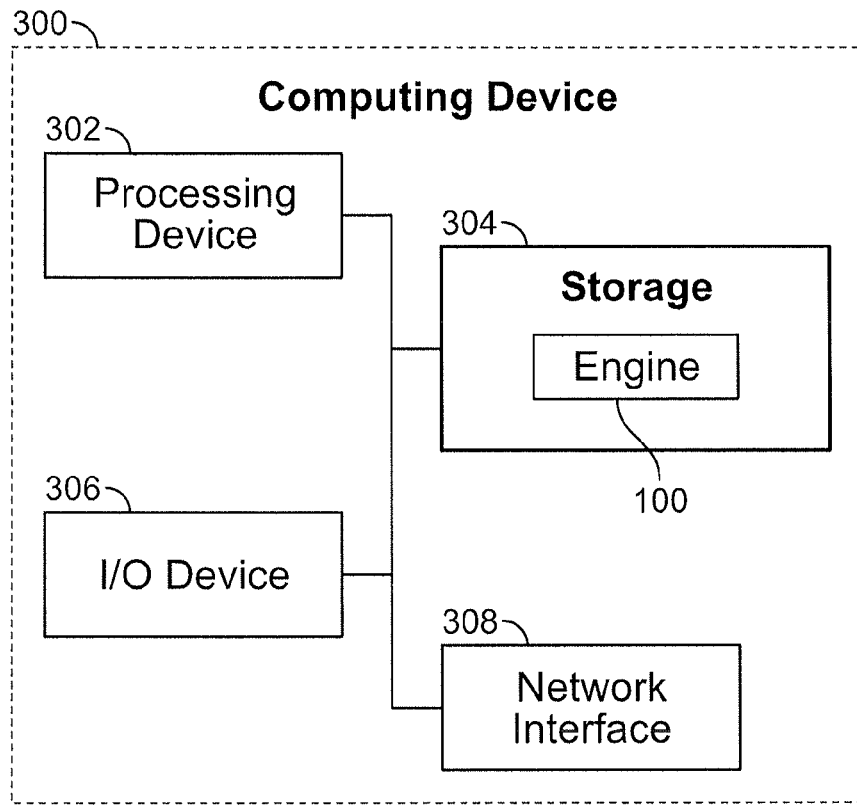
FIG. 3 is a block diagram of an exemplary computing device configured to implement embodiments of a survey prioritization engine.

FIG. 3 is a block diagram of an exemplary computing device 300 configured to implement exemplary embodiments of the engine 100. The computing device 300 can be a mainframe, personal computer (PC), laptop computer, workstation, server, handheld device, such as a portable digital assistant (PDA), and the like. In the illustrated embodiment, the computing device 300 includes a processing device 302, such as a central processing device, and can include a computer storage device 304 (hereinafter "storage 304"). The computing device 300 can further include input/output devices 306, such as a display device, keyboard, touch screen, mouse, printer, and the like, and can include a network interface 308 to facilitate communication between the computing device 300 and other devices communicative coupled to a network.

The storage 304 stores data and instructions and can be implemented using non-transitory computer readable medium technologies, such as a floppy drive, hard drive, tape drive, Flash drive, optical drive, read only memory (ROM), random access memory (RAM), and the like. For example, the storage 304 can store priority parameters, quantifiable characteristics for the priority parameters, priority values, priority value ranges, priority scores, and the like, generated or used by the engine 100. Applications, such as an embodiment of the engine 100, or portions thereof, can be resident in the storage 304 and can include instructions for implementing the applications. The storage 304 can be local or remote to the computing device 300. The processing device 302 operates to run the applications in storage 304, such as the engine 100, by executing instructions therein and storing data resulting from the executed instructions, such as priority scores, which may be presented to a user.

Figure 4:
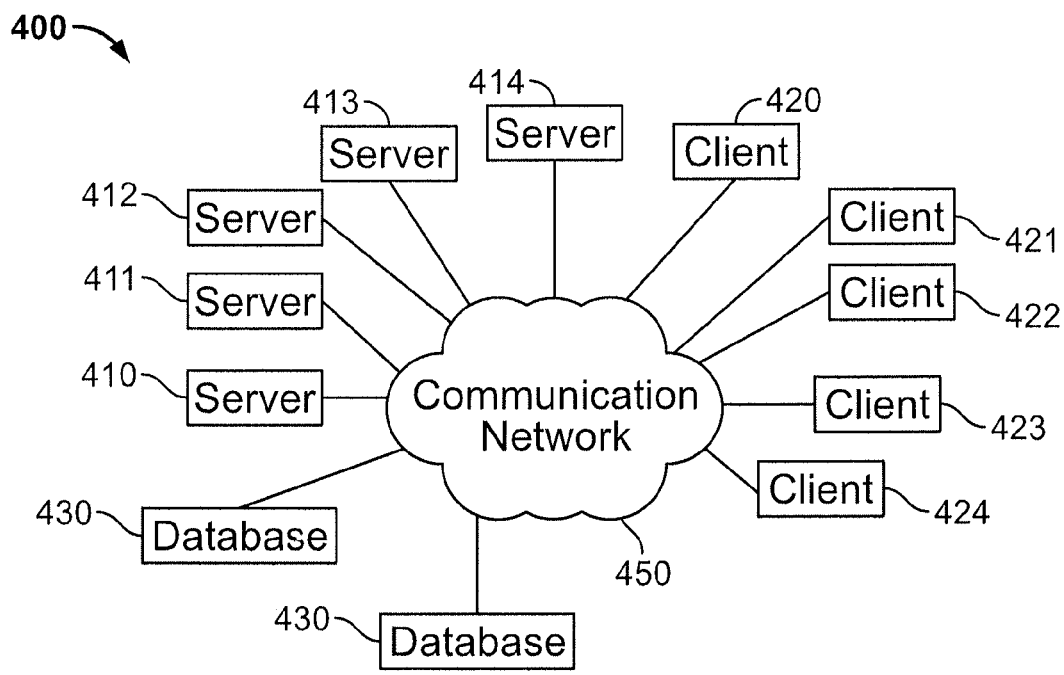
FIG. 4 is a computing system for implementing embodiments of a survey prioritization engine.

FIG. 4 is a block diagram of an exemplary computing system 400 configured to implement one or more embodiments of the engine 100. The computing system 400 includes servers 410-414 operatively coupled to clients 420-424, via a communication network 450, which can be any network over which information can be transmitted between devices communicatively coupled to the network. For example, the communication network 450 can be the Internet, Intranet, virtual private network (VPN), wide area network (WAN), local area network (LAN), and the like. The computing system 300 can include repositories or database devices 430, which can be operatively coupled to the servers 410-414, as well as to clients 420-424, via the communications network 450. The servers 410-414, clients 420-424, and database devices 430 can be implemented as computing devices. Those skilled in the art will recognize that the database devices 430 can be incorporated into one or more of the servers 410-414 such that one or more of the servers can include databases.

In exemplary embodiments, the engine 100 can be distributed among different devices (e.g., servers, clients, databases) in the communication network 450 such that one or more components of the engine 100, or portions thereof, can be implemented by different devices in the communication network 450. For example, in illustrative embodiments, the specification unit 105 can be implemented by the server 410, and the mapping unit 110, generator 115, and prioritizer 120 can be implemented by the server 411.

In an exemplary embodiment, servers 410-414 can be web servers configured to host web pages. Server 410 can be configured to implement the engine 100 and servers 411-414 can be configured to host surveys for a survey hosting site. Client 420 can represent the surveying entity and clients 421-424 can represent survey respondents. The database devices 430 can be configured to store priority parameters, quantifiable characteristics for the priority parameters, priority values, priority value ranges, priority scores, and the like. In an exemplary operation, the respondents can access and respond to the surveys hosted by the servers 411-414 using a web browser implemented by the client devices. The surveys can be presented to the respondents in an ordered list arranged by the priority score determined by the survey engine 100 such that surveys having a higher priority score are towards the top of the list.

Figure 5:
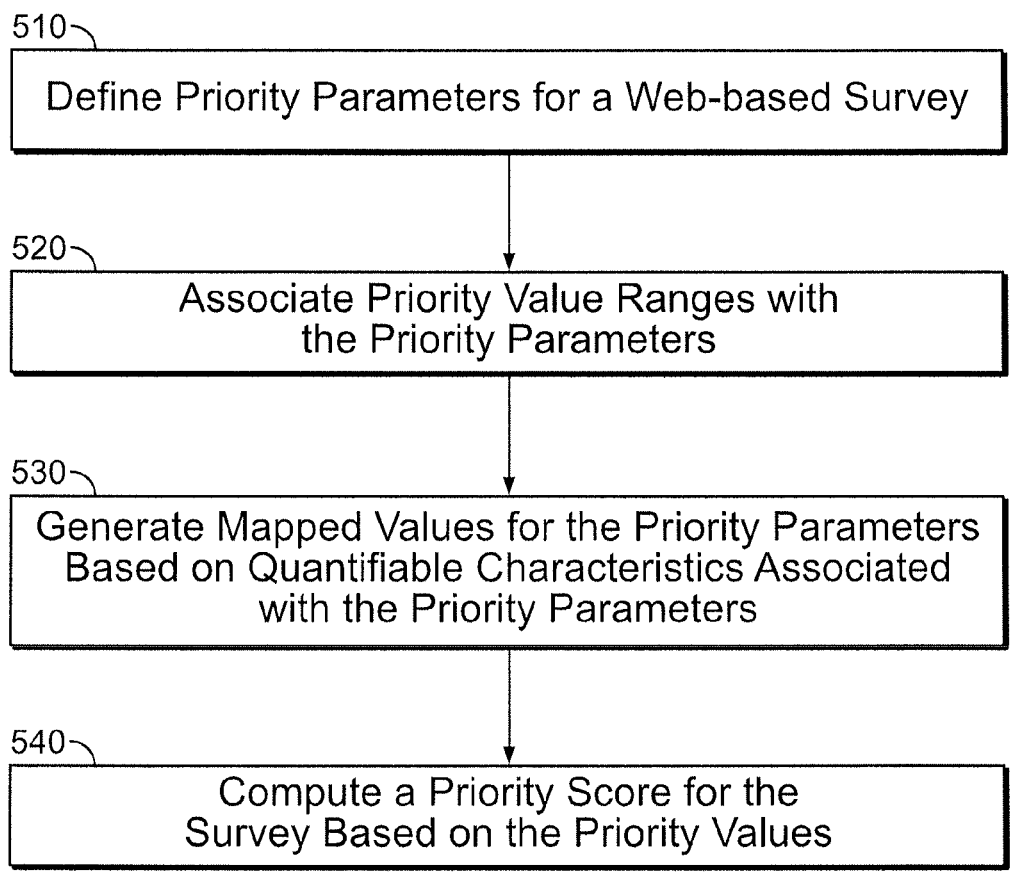
FIG. 5 is a flowchart illustrating prioritizing a survey using a survey prioritization engine.

FIG. 5 is a flowchart illustrating an exemplary prioritization of a web-based survey hosted by a survey hosting site using the engine 100. To begin priority parameters can be defined for a survey (500). Quantifiable characteristics of the survey can be associated with the priority parameters and can be used to determine a priority value of the priority parameters. Each of the priority parameters can be associated with a priority value range having a minimum and maximum possible priority value (510). For each priority parameter, the mapping unit 110 of the engine 100 receives the quantifiable characteristic(s) associated with the priority parameter as an input and outputs a mapped value (520). Using the mapped values, the priority value range, and minimum possible priority values, the engine computes the priority score for the web-based survey, which can be used by the engine to prioritize the survey with respect to other surveys hosted by the survey hosting site (530).

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A method of prioritizing an online web-based survey comprising:
    determining priority values for priority parameters associated with the web-based survey based on (i) characteristic values of the web-based survey associated with the priority parameters and (ii) characteristic values of one or more potential respondents associated with the priority parameters; and
    determining a priority score for the surveys based on the priority values, the priority score establishing a priority of the web-based survey relative to other web-based surveys.

2. The method of claim 1, wherein determining the priority values comprises mapping the characteristic values associated with the priority parameters to mapped values.

3. The method of claim 2, wherein mapping the characteristic values comprises:
    multiplying a first one of the characteristic values associated with a first one of the priority parameters by a first predetermined value to generate a first product;
    dividing the product by a maximum possible characteristic value for the first one of the priority parameters to generate a quotient; and
    subtracting a second predetermined value from the quotient to generate a first one of the mapped values for the first one of the priority parameters.

4. The method of claim 3, wherein determining the priority values comprises computing an output of a step function using the mapped value.

5. The method of claim 4, wherein the step function is defined by the following mathematical expression $$\text{Step}(MP) = 1 \div (1 + e^{-5MP}),$$

wherein MP is the mapped value.

6. The method of claim 4, wherein determining the priority values comprises:
   multiplying the output of the step function by a difference between a maximum possible priority value and a minimum possible priority value associated with the first priority parameter to generate a second product; and
   computing a sum of the second product and the minimum possible priority value associated with the first priority parameter to generate the priority value.

7. The method of claim 1, wherein computing the priority score comprises multiplying the priority values together, the priority values being weighted to emphasize at least one of the priority parameters over another one of the priority parameters when determining the priority score of the online web-based survey.

8. The method of claim 1, further comprising prioritizing the web-based survey based on the priority score.

9. A non-transitory computer readable medium storing instruction, wherein execution of the instructions by a processing device causes the processing device to implement a method for prioritizing a survey hosted by an online web-based survey host site comprising:
   determining priority values for priority parameters associated with the web-based survey based on (i) characteristic values of the web-based survey associated with the priority parameters and (ii) characteristic values of one or more potential respondents associated with the priority parameters; and
   determining a priority score for the surveys based on the priority values, the priority score establishing a priority of the web-based survey relative to other web-based surveys.

10. The medium of claim 9, wherein determining the priority values comprises mapping the characteristic values associated with the priority parameters to mapped values.

11. The medium of claim 10, wherein mapping the characteristic values comprises:
    multiplying a first one of the characteristic values associated with a first one of the priority parameters by a first predetermined value to generate a first product;
    dividing the product by a maximum possible characteristic value for the first one of the priority parameters to generate a quotient; and
    subtracting a second predetermined value from the quotient to generate a first one of the mapped values for the first one of the priority parameters.

12. The medium of claim 11, wherein determining the priority values comprises computing an output of a step function using the mapped value.

13. The medium of claim 12, wherein the step function is governed by the following mathematical expression $$\text{Step}(MP) = 1 \div (1 + e^{-5MP}),$$

wherein MP is the mapped value.

14. The medium of claim 12, wherein determining the priority values comprises:
    multiplying the output of the step function by a difference between a maximum possible priority value and a minimum possible priority value associated with the first priority parameter to generate a second product; and
    computing a sum of the second product and the minimum possible priority value associated with the first priority parameter to generate the priority value.

15. The medium of claim 9, wherein computing the priority score comprises multiplying the priority values together, the priority values being weighted to emphasize at least one of the priority parameters over another one of the priority parameters when determining the priority score of the online web-based survey.

16. The medium of claim 9, further comprising prioritizing the web-based survey based on the priority score.

17. A system for prioritizing an online web-based survey comprising:
    a computer storage device storing a characteristic associated with the web-based survey;
    a processing device configured to determine priority values for priority parameters associated with the web-based survey based on (i) characteristic values of the web-based survey associated with the priority parameters and (ii) characteristic values of one or more potential respondents associated with the priority parameters, and configured to determine a priority score for the surveys based on the priority values, the priority score establishing a priority of the web-based survey relative to other web-based surveys.

18. The system of claim 17, wherein processing device is configured to map the characteristic values associated with the priority parameters to mapped values, the processing device being configured to map the characteristic values by multiplying a first one of the characteristic values associated with a first one of the priority parameters by a first predetermined value to generate a first product, dividing the product by a maximum possible characteristic value for the first one of the priority parameters to generate a quotient, and subtracting a second predetermined value from the quotient to generate a first one of the mapped values for the first one of the priority parameters.

19. The system of claim 18, wherein the processing device is configured to compute an output of a step function using the mapped value, multiply the output of the step function by a difference between an a maximum possible priority value and a minimum possible priority value associated with the first priority parameter to generate a second product, and compute a sum of the second product and the minimum possible priority value to generate the priority value.

20. The system of claim 17, wherein the processing device is configured to multiply the priority values together to generate the priority score associated with the web-based survey, the priority values being weighted to emphasize at least one of the priority parameters over another one of the priority parameters when determining the priority score of the online web-based survey.

21. A method of prioritizing an online web-based survey comprising:
    determining priority values for priority parameters associated with the web-based survey based on characteristic values of the web-based survey associated with the priority parameters; and
    determining a priority score for the surveys based on the priority values, the priority score establishing a priority of the web-based survey relative to other web-based surveys;
    wherein determining the priority values comprises mapping the characteristic values associated with the priority parameters to mapped values; and
    wherein mapping the characteristic values comprises:

multiplying a first one of the characteristic values associated with a first one of the priority parameters by a first predetermined value to generate a first product;

dividing the product by a maximum possible characteristic value for the first one of the priority parameters to generate a quotient; and subtracting a second predetermined value from the quotient to generate a first one of the mapped values for the first one of the priority parameters.

22. A non-transitory computer readable medium storing instruction, wherein execution of the instructions by a processing device causes the processing device to implement a method for prioritizing a survey hosted by an online web-based survey host site comprising:

determining priority values for priority parameters associated with the web-based survey based on characteristic values of the web-based survey associated with the priority parameters; and determining a priority score for the surveys based on the priority values, the priority score establishing a priority of the web-based survey relative to other web-based surveys;

wherein determining the priority values comprises mapping the characteristic values associated with the priority parameters to mapped values; and wherein mapping the characteristic values comprises:

multiplying a first one of the characteristic values associated with a first one of the priority parameters by a first predetermined value to generate a first product;

dividing the product by a maximum possible characteristic value for the first one of the priority parameters to generate a quotient; and subtracting a second predetermined value from the quotient to generate a first one of the mapped values for the first one of the priority parameters.

23. A system for prioritizing an online web-based survey comprising:

a computer storage device storing a characteristic associated with the web-based survey;

a processing device configured (i) to determine priority values for priority parameters associated with the web-based survey based on characteristic values of the web-based survey associated with the priority parameters, (ii) to determine a priority score for the surveys based on the priority values, the priority score establishing a priority of the web-based survey relative to other web-based surveys, and (iii) to map the characteristic values associated with the priority parameters to mapped values, the processing device being configured to map the characteristic values by multiplying a first one of the characteristic values associated with a first one of the priority parameters by a first predetermined value to generate a first product, dividing the product by a maximum possible characteristic value for the first one of the priority parameters to generate a quotient, and subtracting a second predetermined value from the quotient to generate a first one of the mapped values for the first one of the priority parameters.

* * * * *